2,990,396
PRODUCTION OF POLYMERIC MATERIALS FROM POLYOXYALKYLENE POLYOLS AND ORGANIC POLYEPOXY COMPOUNDS

Jared W. Clark, Charleston, and Alfred E. Winslow, Scott Depot, W. Va., assignors to Union Carbide Corporation, a corporation of New York
No Drawing. Filed Oct. 14, 1955, Ser. No. 540,636
23 Claims. (Cl. 260—47)

This invention relates to a process for the production of synthetic polymeric hydroxyl-containing products of high molecular weight and to the products produced thereby as new compositions of matter. More particularly, this invention relates to the process for the production of such products by the reaction of a polyoxyalkylene polyol with an organic polyepoxy compound. The products made by this invention are hydroxyl-containing products of high molecular weights, which can range in consistency from soft, waxy materials to rigid, resinous solids, and which may be water soluble or water insoluble, depending primarily upon the amount of particular polyepoxy compound employed in their preparation as hereinafter described.

These compounds are particularly useful as lubricants for molding and extruding, dispersing agents, thickeners, suspending agents, coagulating agents for aqueous suspensions, surface-active agents, dispersing agents and as coating, textile sizing, binding, laminating and casting compositions.

According to the present invention a polyoxyalkylene polyol, and preferably a polyoxyalkylene glycol having an average molecular weight of at least 600, and more preferably between 1000 and 10,000 is reacted with an organic polyepoxy compound having as the sole reactive groups under the conditions of the reaction, at least two epoxy groups in the presence of catalytic amounts of a Friedel-Crafts type catalyst or an alkali metal alcoholate-forming compound for the polyoxyalklyene polyol.

The polyoxyalkylene polyols which are useful in this process are commonly produced by the polymerization of an alkylene oxide having terminal epoxy groups, such as ethylene oxide, propylene oxide, butylene oxide and the like, on an aliphatic or an aromatic compound having preferably at least two primary hydroxyl groups, but which may contain one or more secondary hydroxyl groups. Such compounds as may be used to prepare these polyols are ethylene glycol, propylene glycol, glycerol, diethylene glycol, sorbitol, sucrose and like polyhydroxy compounds. Preferred in this reaction are the linear chain polyoxyalkylene glycols represented by the general formula:

$$H—O(RC_2H_3—O)_n—H$$

wherein R is a member selected from the group consisting of hydrogen and lower alkyl groups having from one to three, inclusive, carbon atoms, and $n$ is an integer such that the average molecular weight of the polyglycol chain is at least 600.

Preferred of this chain are the polyoxyethylene glycols and polyoxypropylene glycols having an average molecular weight of between about 1000 and about 10,000 and more particularly preferred are the polyoxyethylene glycols.

Since these polyoxyalkylene glycols are prepared by a polymerization of the alkylene oxides, they are composed of a mixture of polyglycols of various molecular weights, to which mixtures have been assigned an average molecular weight. The determination of the average molecular weight assigned to these mixtures is ascertained by known methods of determining physical and chemical properties. For the higher members of this class of polyglycols, our preferred method of assigning average molecular weights is according to a reduced viscosity measurement of a solution containing 0.20 gram of the polyoxyalkylene glycol in 100 ml. of acetonitrile and for the lower members of this class, we prefer esterification or acetylation methods. Reduced viscosity of the polyglycols is determined according to the following formula:

$$\text{Reduced viscosity} = I_R = \frac{I - I_0}{(I_0)(c)}$$

where $I$ = viscosity of solution
$I_0$ = viscosity of solvent
$c$ = concentration in grams per 100 ml. of solvent Average molecular weight of the polyglycol is then assigned according to the reduced viscosity. For example, a polyoxyethylene glycol having a reduced viscosity in acetonitrile at 30° C. determined in the above manner of about 0.17 has been assigned an average molecular weight of about 6000 and a polyoxyethylene glycol solution having a reduced viscosity of 0.08 determined in the same manner has been assigned an average molecular weight of about 4000. A polyoxyethylene glycol solution having a reduced viscosity of about 0.02 determined in the same manner has an assigned molecular weight of about 1000, but with the materials exhibiting such low reduced viscosities, we prefer to make the determination of molecular weight by an esterification method.

This method briefly consists of esterifying a 7½ gram sample of the polyoxyethylene glycol (dissolved in pyridine to make 25 ml.) by the addition of 25 ml. of a solution prepared by dissolving 42 grams of phthalic anhydride in 300 ml. of freshly distilled pyridine. After heating to about 98° C. for 30 minutes, the samples are cooled and 50 ml. of 0.5 N sodium hydroxide added. The same procedure is followed on a blank containing no polyglycol. Samples and blanks are titrated to a neutral end point with additional 0.5 N sodium hydroxide. Average molecular weight is then calculated according to the formula:

$$\text{Avg. mole. wt.} = \frac{2000 \times S}{(B-A) \times N}$$

where $A$ = ml. of N normal NaOH for sample
$B$ = ml. of N normal NaOH for blank
$S$ = original sample weight in grams The organic polyepoxy compounds suitable for use in preparing the polymeric products of this invention are organic compounds having as the sole reactive groups under the conditions of this reaction, at least two epoxy groups. By this we mean to exclude compounds containing carboxyl, hydroxyl, phenolic hydroxyl, amino, amido, imido and mercapto groups, which have been found to be reactive under the conditions of this reaction with epoxy groups of the polyepoxy compound or with the hydroxyl groups and alkali metal alcoholate groups of the polyoxyalkylene glycol, and thus will interfere with the desired condensation. These polyepoxy compounds free of such interfering groups can be aliphatic, cycloaliphatic and aromatic, and can contain non-interfering substituent groups such as alkyl, aryl, organic ester, phosphate ester, halogen, cyano groups and the like without interfering with the condensation. Olefinic unsaturation in the polyepoxy compound can also be present.

The preferred organic polyepoxy compounds are the aliphatic, cycloaliphatic and aryl substituted aliphatic compounds having as the sole reactive groups under the conditions of the reaction, at least two epoxy groups, and wherein oxygen is present only in oxirane, ether and ester arrangement. Particularly preferred are the diepoxy compounds consisting only of carbon, hydrogen and oxygen, wherein oxygen is present only in oxirane, ether and ester arrangement, and wherein the epoxy groups are terminal groups of an aliphatic or aryl substituted aliphatic compound or where the epoxy group or groups include adjacent carbon atoms of a cycloaliphatic ring. Representative of these preferred compounds are butadiene diepoxide, diglycidyl ether, the diglycidyl ether of 2,2 - bis(4 - hydroxyphenyl) - propane, 4 - vinyl-cyclohexene diepoxide, dicyclopentadiene diepoxide, bis(2,3-epoxycyclopentyl) ether, ethylene glycol bis(3,4-epoxymethylcyclohexanecarboxylate) and the 3,4-epoxy-methylcyclohexylmethyl 3,4 - epoxy - methylcyclohexanecarboxylate.

It is to be understood that the invention is not limited to the foregoing compounds alone and a variety of organic polyepoxy compounds can be used. While it is preferred that the epoxy groups be terminal groups or include adjacent carbon atoms of a cycloaliphatic ring, aliphatic and substituted aliphatic compounds having adjacent carbon atoms of the epoxy group as adjacent intermediate carbon atoms of a linear chain may be used. However, compounds having such internal epoxy groups react somewhat slower compared with those compounds having terminal epoxy groups.

A mixture of two or more polyepoxy compounds can be used in the practice of this invention, or if desired, the polyoxyalkylene glycol can be reacted successively with different polyepoxy compounds to obtain these polymeric products.

These polyepoxy compounds serve both as chain extenders between polyoxyalkylene glycol chains and as cross-linking agents. According to our experience, primary hydroxyl groups of the polyoxyalkylene glycol react preferentially with the epoxy groups to link up the polyglycol chains, creating secondary hydroxyl groups upon opening of the epoxide ring. The resultant product can undergo still further linking on the primary and secondary hydroxyl groups present in the reaction mixture with additional epoxy groups of the polyepoxy compound used, creating linear and cross-linked structures. The reaction of the primary hydroxyl groups can be represented by the following scheme, shown here for the purposes of illustration only, with an organic polyepoxy compound having terminal epoxy groups.

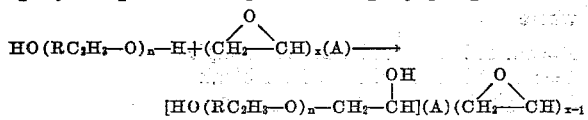

where A represents the residue of the polyepoxy compound and $x$ is an integer of at least 2. Thus it is seen that the initial polymeric product is formed by condensation of hydroxyl groups of the polyol with epoxy groups of the diepoxy compound.

Thus the remaining epoxy groups of the polyepoxy compound can react with other primary hydroxyl groups in a similar way, or can react with secondary hydroxyl groups thus created, with the primary hydroxyl groups reacting preferentially to secondary hydroxyl groups. The reaction with the secondary hydroxyl groups can be represented by the following scheme, shown here for purposes of illustration only, where a similar polyepoxy compound as shown above reacts with a product formed as in the above scheme wherein all epoxy groups of the polyepoxy compound have reacted with primary hydroxyl groups of separate polyglycol chains:

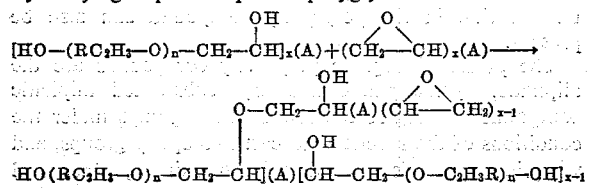

The remaining epoxy groups can react with other primary or secondary hydroxyl groups substantially crosslinking such compounds and extending the molecular chains.

Thus, it is possible under this invention, to obtain useful products having average molecular weights many fold over those of the starting polyoxyalkylene glycols. These products may be chain products substantially linear in structure or may be substantially cross-linked, depending primarily upon the molar ratio of particular polyepoxy compound to polyglycol employed in their preparation.

Products which are primarily linear in structure and derived from polyoxyethylene glycols exhibit a high degree of water-solubility. With an increase in the degree of cross-linking present in the product, the water-solubility decreases. We have found that products can be prepared having three or more times the average molecular weight of the starting polyglycol compound and still be water soluble.

When the polyoxyalkylene polyols having secondary hydroxyl groups are employed in this reaction, the reaction of the epoxy groups follows the same mode, with primary hydroxyl groups reacting preferentially to link up polyalkylene polyol chains. Cross-linking can also take place by the reaction of the original and/or created secondary hydroxyl groups to produce similar products to those made from the polyglycols.

The polyepoxy compounds can be used in the process of this invention in amounts up to 20 mols or more per mol of the polyoxyalkylene glycol. Amounts of from about 0.2 to about 20 mols per mol of polyglycol are preferred. Products made using over 20 mols of the polyepoxy compound per mol of the polyglycol are extremely brittle and of little commercial value. Products made using less than about 0.2 mol of polyepoxy compound per mol of polyglycol do not exhibit the properties of the compositions of the invention and are not considered a parts thereof. Within the range of polyepoxy compounds herein employed, the products vary from water-soluble, soft, waxy or gum-like materials having good lubricating, suspending and thickening properties in the lower molecular concentrations of polyepoxy compound employed in the reaction, to rigid, water-insoluble resinous solids suitable for molding, casting and machining in the higher molecular concentrations of polyepoxy compound employed.

The temperature at which the reaction of the polyepoxy compound with the polyglycol is carried out is not narrowly critical and can range from about 25° C. to about 250° C. It is preferred that the reaction be carried out with the polyglycol in the liquid state but below the decomposition temperature of the reactants and products. For most reactions, a temperature of 50° C. to about 150° C. is preferred. Inert diluents or solvents can be employed to enable mixing of the reactants at temperatures below the melting point of the polyglycol. Such inert solvents as dioxane, the diethyl ethers of ethylene and diethylene glycol, and benzene, toluene and xylene can be employed for this purpose. It is preferred in this process that less than 50 percent of the reaction mixture constitute the solvent, and more advantageously between about 10 to about 40 percent.

The reaction is conveniently carried out at atmospheric pressure, although pressures both above and below atmospheric can be employed. It is desirable to exclude air during the reaction by employing an inert atmosphere such as nitrogen, to cover the reaction mixture to prevent or inhibit any degradation of the product or deactivation of the catalyst.

We have found that the compounds which serve to promote the condensation of the polyepoxy compound with the polyoxyalkylene glycol are the Friedel-Crafts type catalysts, such as the halides of boron, aluminum, zinc, iron and tin, and particularly boron trifluoride and stannic chloride, and the alkali metal alcoholates of the polyoxyalkylene glycol. By the term alkali metal alcoholates of the polyoxyalkylene glycol we mean the polyoxyalkylene materials where one or more of the hydroxyl groups are converted to an alkali metal alcoholate group by the reaction of the polyglycol with catalytic amounts of an alkali metal alcoholate-forming compound such as the alkali metals, alkali metal oxides, alkali metal hydroxides, akali metal hydrides, alkali metal alcoholates and the like.

It is not critical to the operation of our invention that these alcoholates be prepared in any particular manner. The presence of an alkali metal alcoholate-forming compound with the polyglycol is sufficient to cause reaction, although the application of mild heat is advantageous for faster reaction. The alcoholate of the polyglycol can be prepared in situ by adding the alkali metal alcoholate-forming compound to the polyglycol immediately prior to the reaction with the polyepoxy compound or the alcoholate may be made elsewhere and stored until used in this process.

As is the case with most catalysts, the precise function of the alkali metal alcoholate or the polyglycol reactant is not completely understood, but such understanding is not critical to the practice of this invention. It is presumed that some of the alkali metal alcoholate groups may enter into the reaction, similar to the action of hydroxyl groups, with the epoxy groups. It is not necessary, and in fact, not desirable, to employ the alcoholate-forming compound in amounts theoretically necessary to convert both hydroxyl groups of the polyglycol compound to the alcoholate groups.

We have discovered that under substantially anhydrous conditions, the alkali metal alcoholates of the polyglycol reactant made using metallic sodium or potassium promote the reaction of the polyepoxy compound and polyoxyalkylene compound. Surprisingly enough, we have also found that minor amounts of water in the reaction mixture can be tolerated, so that the aqueous solutions of alkali metal hydroxides can be employed as the alcoholate-forming compound with excellent success.

However, when any of the named alkali metal alcoholate-forming compounds are employed in this reaction, there may also be present the alkali metal hydroxide formed by the reaction of the alcoholate-former with moisture present in the polyglycol, or with water formed as a by-product of the reaction of the polyglycol with the alcoholate-former. It is contemplated that some catalytic activity may be attributable to the presence of the alkali metal hydroxide.

Sodium and potassium hydroxide are the preferred alcoholate-forming compounds in this process. They are easy to handle and are effective in low concentrations in promoting the reaction. They are particularly desirable for use with polyepoxy compounds having terminal epoxy groups.

Amounts of the alkali metal alcoholate-forming compound of as low as about 0.05 percent of the weight of the polyglycol have been found to be effective in converting sufficient hydroxyl groups of the polyglycol to the alcoholate group for promoting the reaction, with amounts of about 0.1 percent to about 0.5 percent being preferred, although greater amounts can be used.

The Friedel-Crafts type catalysts employed to effect this same reaction are likewise effective in amounts of about 0.05 percent by weight of the polyglycol and preferably between about 0.1 percent and 0.5 percent of the weight of the polyglycol. We have found that the preferred Friedel-Crafts type catalysts, boron trifluoride and stannic chloride, are particularly desirable for promoting the reaction when the polyepoxy compound contains epoxy groups containing adjacent carbon atoms of a cycloaliphatic ring.

The order for adding the reactants and catalyst is not critical in the operation of this process. One reactant can be added to a mixture of the other reactant and the catalyst, or the catalyst can be added to a mixture of the two reactants. The addition may be continuous, in small successive amounts, or in one large amount.

It is, of course, permissible to interrupt the reaction by adding a chain stopping agent, or by neutralizing the reaction mixture. When a Friedel-Crafts type catalyst is employed, a base such as sodium hydroxide can be used to neutralize the acid and where the alkali metal alcoholate of the polyglycol reactant is employed, an acid such as phosphoric acid can be added to neutralize the mixture and stop the reaction. Such methods are particularly useful in controlling the physical properties or molecular weight of the products.

Our preferred method of making the water-soluble high molecular weight products consists of heating a polyoxyethylene glycol having an average molecular weight of about 6000 to a temperature of about 65°–100° C. in an inert atmosphere such as nitrogen, and dissolving in it about 0.2 to about 0.5 percent by weight of the polyglycol of sodium or potassium hydroxide added as a 50 percent aqueous solution. Reaction takes place when about 0.2 to 0.5 mole per mole of polyoxyethylene glycol of butadiene diepoxide or the diglycidyl ether of 2,2-bis-(4-hydroxyphenyl)propane or its equivalent of other polyepoxy compounds is thoroughly mixed in the polyglycol-catalyst mixture. A rise in viscosity is evident in about 5–10 minutes, indicating formation of higher molecular weight polymeric materials. The catalyst need not be removed from the reaction mixture, although if desired, it can be neutralized with an acid such as phosphoric acid when the desired viscosity is reached.

These products are waxy or gum-like in appearance, soluble in water and acetonitrile, and appear from their characteristics to be predominantly linear polymeric products. These products have good lubricating qualities, and serve efficiently as suspending, thickening, dispersing and coagulating agents for aqueous solutions and the like. The products are easily flaked and granulated in conventional resin handling equipment. Aging of the water-soluble, waxy products does not affect their water-solubility or other physical properties.

Our preferred process for making the water-insoluble resinous products consists of heating a polyoxyethylene glycol having an average molecular weight of about 6000 to a temperature of about 65°–100° C. in an inert atmosphere such as nitrogen and dissolving in it 0.2 to 0.5 percent by weight of sodium or potassium hydroxide added as a 50 percent aqueous solution. Reaction takes place when one and a half moles and preferably about two moles or more per mole of polyoxyethylene glycol of butadiene diepoxide or the diglycidyl ether of 2,2-bis(4-hydroxyphenyl)propane or its equivalent of other polyepoxy compound is thoroughly mixed with the glycol-catalyst solution. Reaction is rapid and the product can be immediately cast in a mold. It is preferred that the resin be cured by heating in an oven at about 80°–100° C. for 2–20 hours to assure complete reaction, although slow curing does take place at room temperature.

These rigid resinous products are insoluble in water and acetonitrile, being somewhat flexible and having high impact strengths and low brittle temperatures in the lower concentrations of polyepoxy compounds employed, and are substantially cross linked. With the preferred diepoxy compounds, butadiene diepoxide and the diglycidyl ether of 2,2-bis(4-hydroxyphenyl)propane, it has been found that our preferred water-insoluble resinous materials are made using about 1.5 or more moles of diepoxy compound per mole of polyglycol, and the preferred water-soluble compounds are made using less than 1.5 moles of diepoxy compound. However, even fewer moles of a tri- or tetra-epoxy compound would produce rigid cross-linked products.

However, as with most polymerization products, no exact line of demarcation exists between the water-soluble and water-insoluble products in relation to molecular concentration of polyepoxy compound used. Thus a high-impact strength resin, substantially insoluble in water, was obtained with 1.4 moles of butadiene diepoxide, which was slightly flexible although it could be machined. Rigid resins can be prepared by the use of higher ratios of polyepoxy compound to polyglycol with consequent increase in the degree of cross-linking. The cross-linked structures have improved dimensional stability and high impact strengths. The rigid resins are easily machined, or can be cast into various shapes, being dimensionally stable over a wide temperature range.

The following examples are illustrative:

Example 1

To 1000 grams of a polyoxyethylene glycol having an average molecular weight of approximately 6000 heated to about 65° C. in a nitrogen atmosphere, 8.873 grams of aqueous 50 percent sodium hydroxide solution were added with stirring and allowed to dissolve and thereafter a 109 gram portion of this solution was transferred to another vessel and heated to 95° C. in a nitrogen atmosphere, and 2.878 grams of diglycidyl ether of 2,2-bis(4-hydroxyphenyl)propane were quickly added, with stirring. This amount corresponds to a molar ratio of 0.5:1 of the diglycidyl ether to the polyoxyethylene glycol. Thereafter the temperature was held within the range of 95° C. to 110° C. for 40 minutes, and the reaction mixture was allowed to cool to room temperature and solidify. The solid material was a tan-colored wax which melted at 60° C.

A solution prepared by dissolving 0.20 gram of the solid product in 100 ml. of acetonitrile had a reduced viscosity of 0.56 at 30° C. A solution of 50 grams of the product in 150 grams of water contained only traces of gel and had a viscosity at 30° C. of 913 centipoises.

Example 2

One thousand grams of polyoxyethylene glycol having an average molecular weight of about 6000 was melted in a nitrogen atmosphere, and nine grams of aqueous 50 percent potassium hydroxide was added and allowed to dissolve with stirring. After holding the solution at a temperature of between 50° and 70° C. overnight under nitrogen atmosphere, a 136-gram portion of this solution was heated to 78° C., and 1.36 grams of butadiene diepoxide were quickly added. This corresponds to a molar ratio of 0.7:1 of butadiene diepoxide to the polyoxyethylene glycol. The temperature was held between 78°–120° C. for 15 minutes, then at 97° C. for 45 minutes, and then permitted to cool to room temperature and solidify.

A solution prepared by dissolving 54.5 grams of the solid product in 163.5 grams of water contained only traces of an insoluble gel, while the product was completely soluble in acetonitrile. A solution of 0.2 gram of the product in 100 ml. of acetonitrile had a reduced viscosity of 0.61 at 30° C.

Example 3

To 1000 grams of a melted polyoxyethylene glycol having an average molecular weight of about 6000, five grams of boron trifluoride-diethyl ether complex containing 47 percent boron trifluoride was slowly added at a temperature above the melting point of the polyoxyethylene glycol in a nitrogen atmosphere. This mixture was allowed to cool to room temperature and kept for 48 hours.

To another 600 grams of this polyoxyethylene glycol having an average molecular weight of about 6000, which was melted in a nitrogen atmosphere at a temperature of about 65° C., 60 grams of 3,4-epoxy-6-methylcyclohexylmethyl 3,4-epoxy - 6 - methylcyclohexanecarboxylate was added. The mixture was allowed to cool to room temperature. A 35 gram portion of the first polyoxyethylene glycol mixture containing the boron trifluoride catalyst was remelted in an inert atmosphere at 86° C. and a 57 gram portion of the polyoxyethylene glycol containing the dissolved 3,4-epoxy-6-methylcyclohexylmethyl 3,4-epoxy-6-methylcyclohexanecarboxylate was added and stirred until it dissolved. This mixture gave a reactant molar ratio of 1.28:1 of the polyepoxy compound to the polyoxyethylene glycol. A noticeable increase in viscosity was observed in about one minute after the addition of the glycol-polyepoxy reactant. After holding the reaction mixture at a temperature of about 86° C.–78° C. for six minutes, it was allowed to cool to room temperature and solidify.

The solid waxy product was soluble in water. A solution of 0.20 gram of the product in 100 ml. of acetonitrile had a reduced viscosity of 0.27 at 30° C. The product had a melt viscosity at 100° C. of 17,500 centipoises. A solution containing 50 grams of the product in 150 grams of water had a viscosity at 30° C. of 82 centipoises.

Example 4

To 800 grams of a polyoxyethylene glycol having an average molecular weight of approximately 1000, maintained at 91° C. there was slowly added 10 grams of a 50 percent aqueous potassium hydroxide solution with agitation, while nitrogen was continuously passed over the liquid mixture. After 45 minutes, during which time the temperature increased to 98°–100° C., 179 grams of diglycidyl ether of 2,2-bis(4-hydroxyphenyl)propane was quickly added while the mixture was agitated and held at 100° C. This amount corresponds to a molar ratio of 0.7:1 of the diglycidyl ether to the polyoxyethylene glycol. The viscosity of the reaction mixture gradually increased and was above 100,000 centipoises at 100° C. 45 minutes after addition of the diglycidyl ether of 2,2-bis(4-hydroxyphenyl)propane. Seventy-five minutes after the addition of the diglycidyl ether the reaction mixture was neutralized by adding 3.8 grams of 75 percent aqueous orthophosphoric acid. The reaction product was transferred to a shallow pan and allowed to cool to room temperature to solidify.

The viscosity of a 25 percent aqueous solution of the solid, wax-like product was 220 centipoises at 100° F. The product was soluble in water and melted at 38–40° C.

Example 5

To 800 grams of a polyoxyethylene glycol having an average molecular weight of about 6000, heated in an atmosphere of nitrogen to 100° C. there was slowly added 3.20 grams of anhydrous stannic chloride with agitation. Thereafter 21.34 grams were withdrawn for testing purposes and 324 grams of the catalyst-glycol solution were removed and replaced with 324 grams more of the starting polyoxyethylene glycol and thoroughly mixed. The melt viscosity of this material was 1100 centipoises at 100° C. The solution was maintained at 100° C., when 67.94 grams of diglycidyl ether of 2,2-bis(4-hydroxyphenyl)propane were slowly added and mixed. This amount corresponds to a molar ratio of 1.5:1 of the diglycidyl ether to polyoxyethylene glycol. A viscosity rise to 100,000 centipoises measured at 100° C. was observed 1.3 hours after the addition of the diepoxide. The mixture was maintained at aproximately 100° C. for a total reaction period of 2.3 hours, when it was converted to a pH of 5.0 by the addition of 0.486 gram of 50 percent aqueous sodium hydroxide solution. The reaction mixture was poured into a shallow pan and allowed to cool to room temperature.

A solution of 0.20 gram of the solid product in 100 ml. of acetonitrile had a reduced viscosity of 0.325 at 30° C. A solution of 50 grams of the product dissolved in 150 grams of water had a viscosity of 1438 centipoises at 30° C.

Example 6

A diepoxide, bis(2,3-epoxycyclopentyl) ether was prepared for reaction by epoxidizing the known bis(2-cyclopentyl) ether in the following manner:

To a 338 gram sample of the bis(2-cyclopentenyl) ether (2.25 moles) having a boiling point of 80° C. at 10 mm. pressure and a refractive index $n_D^{30}$ of 1.4857, there was added 3081 grams of a 22.2 percent solution in acetone of peracetic acid (9.0 moles) as the epoxidizing agent, in a dropwise manner over a five hour period, while the temperature of the reaction was maintained at 25°–35° C. Stirring was continued for an additional day after the peracetic acid and acetone was added, and the mixture maintained at room temperature. Titration of the peracetic acid at this time indicated the epoxidization reaction had proceeded to 95 percent completion.

The reaction mixture was fed into a still kettle containing boiling ethylbenzene, and the acetone, excess peracetic acid, and acetic acid were removed as a distillate, leaving the bis(2,3-epoxycyclopentyl) ether as a residue product. The residue was distilled under vacuum, and a 320-gram semi-solid fraction containing the bis(2,3-epoxycyclopentyl) ether, boiling at 107° C. at 2.1 mm. Hg pressure was obtained. Recrystallization of this fraction from ethyl benzene gave colorless crystals identified as bis(2,3-epoxycyclopentyl) ether having a melting point of 56°–57° C. Elemental analysis for $C_{10}H_{14}O_3$, 65.91% C, 7.74% H; found, 65.88% C, 7.81% H. An analysis for epoxide by the pyridine hydrochloride method indicated a purity of 96 percent.

To 500 grams of a polyoxyethylene glycol having an average molecular weight of about 6000, maintained in an atmosphere of nitrogen at about 65° C., there was slowly added 3.3 grams of aqueous 50 percent potassium hydroxide with stirring until the potassium hydroxide all dissolved. The reaction mixture was cooled to room temperature and stored overnight.

A 108 gram sample of the mixture was then remelted in a nitrogen atmosphere while stirring and then heated to about 100° C. when 4.64 grams of the bis(2,3-epoxycyclopentyl) ether as prepared in the above-described manner was added.

This amount corresponds to a molar ratio of 1.42:1 of the diepoxy ether to polyoxyethylene glycol. The reaction temperature was maintained between 88° C. and 110° C. during the following nine hours. Two 0.7 gram portions of 50 percent aqueous potassium hydroxide catalyst were added at reaction times of 0.5 hour and 8.5 hours, figured from the time of addition of the polyepoxy compound. The product was allowed to cool to room temperature and solidify.

One gram of the solid wax-like product was dissolved in 30 grams of acetonitrile, and traces of insoluble gel were removed by filtration. The filtrate was dried in vacuo at room temperature overnight. A solution prepared by dissolving 0.20 gram of this dried material in 100 ml. of acetonitrile had a reduced viscosity of 0.28. A solution prepared by mixing 10 grams of the solid reaction product in 290 grams of water contained a small amount of insoluble gel, estimated to be 0.24 gram.

*Example 7*

To 543 grams of a polyoxyethylene glycol having an average molecular weight of about 10,000, there was slowly added 2.8 grams of solid potassium which was allowed to react before 554 grams of dioxane was added at a temperature of about 68°–90° C. Stirring was continued until the polyglycol and the alkali metal alcoholate polyglycol were completely dissolved. Then 26.6 grams of diglycidyl ether of 2,2-bis(4-hydroxyphenyl) propane was added as a 25 percent solution in the starting polyoxyethylene glycol during the next hour and forty minutes. The reaction was maintained at a temperature of 68°–75° C. during the addition of the diepoxide. The mixing was continued for an additional eight minutes and the reaction was neutralized by the addition of 3.1 grams of 75 percent phosphoric acid. The viscosity of the neutralized reaction mixture was 15,000 c.p.s. at 72° C. A five percent aqueous solution of the reaction mixture had a pH of 7.5.

The dioxane was removed from a representative sample of the reaction mixture by drying to a constant weight in an oven under a reduced pressure at about 60° C. The product was a wax-like solid, soluble in water and having traces of insoluble gel in acetonitrile. A solution prepared by dissolving 0.20 gram of the dried material in 100 ml. of acetonitrile had a reduced viscosity of 1.0 at 30° C.

*Example 8*

To 2378 grams of a polyoxyethylene glycol having an average molecular weight of about 6000 over which air was continuously displaced by nitrogen at a temperature of 70° C., there was added slowly 4.7 grams of solid potassium over a 10 minute period, while stirring. After the potassium was completely dissolved, 47 grams of diglycidyl ether of 2,2-bis(4-hydroxyphenyl)propane was added slowly over a period of eight minutes. This corresponds to a molar ratio of 0.35:1 of polyepoxy compound to polyoxyethylene glycol. The reaction mixture was allowed to stir for 2.9 hours, and was then neutralized to a pH of 6.6 with 9.4 grams of aqueous 85 percent ortho-phosphoric acid. The reaction product was allowed to cool in a shallow pan and was a wax-like solid at room temperature. It was stored for three months in the presence of air. Properties of the aged product were substantially unchanged. A solution of 0.20 gram of the product after aging dissolved in 100 ml. of acetonitrile had a reduced viscosity of 0.27 at 30° C. The starting polyglycol reactant at the same concentration in acetonitrile had a reduced viscosity of 0.18 as determined in the same manner.

*Example 9*

To 392 grams of a polyoxyethylene glycol having an average molecular weight of about 1000, in a sigma-blade mixer there was added eight grams of boron trifluoride (added as the diethyl ether complex containing 47 percent boron trifluoride). Mixing of the glycol and catalyst was started and the temperature gradually raised by external means to 42° C., at which temperature 105 grams of diglycidyl ether was added. This corresponds to a molar ratio of about 0.5 mole of polyglycol per mole of polyepoxy compound. The reaction was immediate and the temperature of the reaction mixture increased to 130° C. and the viscosity of the reaction mixture rose to above 100,000 centipoises during a five-minute period. Twenty-five minutes later, 1.2 grams of 50 percent aqueous sodium hydroxide was added to neutralize the reaction mixture.

The reaction product was water-soluble and a five percent aqueous solution had a pH of 4.2. The pH of the mixture was adjusted, so that a five percent aqueous solution had a pH of 6.3 by the addition of 1.4 grams of 50 percent aqueous sodium hydroxide. The reduced viscosity of a solution of 0.2 gram of the neutralized product dissolved in 100 ml. of acetonitrile was 0.28 at 30° C. The product was completely water-soluble and a 25 percent aqueous solution had a viscosity of 70.4 centistokes at 100° F. A five percent aqueous solution had a color of 100 on a platinum-cobalt scale.

*Example 10*

To 530.7 grams of a polyoxyethylene glycol having an average molecular weight of about 1000 there was added 1.3 grams of boron trifluoride (added as the diethyl ether complex containing 47 percent boron trifluoride), and 532 grams of anhydrous toluene were thoroughly mixed with the above ingredients in a 2-liter reaction flask to dissolve the glycol and boron trifluoride catalyst. The mixture was heated to 58° C. with stirring and 150 grams of bis(2,3-epoxycyclopentyl) ether as prepared in Example 6, was added. The reaction temperature rose to 102° C. and was maintained at 100–102° C. for three hours. At the end of this period 1.8 grams of 50 percent aqueous solution of sodium hydroxide was added to neutralize the reaction mixture and the reaction mixture cooled to 40° C. Toluene was distilled off under reduced pressure to a final pressure of 2 mm. and temperature of 120° C.

The resultant residue product was completely water-soluble and a five percent aqueous solution of the product had a pH of 7.15. The reduced viscosity of a solution of 0.2 gram of product in 100 ml. of acetonitrile at 30° C. was 0.098. A 25 percent aqueous solution had a viscosity of 12.6 centistokes at 100° F. The product was a water-soluble wax-like material.

Example 11

To 500 grams of a polyoxyethylene glycol having an average molecular weight of about 1000 contained in a sigma-blade mixer there was added 2.13 grams of boron trifluoride (added as the diethyl ether complex containing 47 percent boron trifluoride). The glycol and catalyst were mixed and heated to 42° C., at which temperature 125 grams of 3,4-epoxy-6-methylcyclohexylmethyl 3,4-epoxy-6-methylcyclohexanecarboxylate was added with continuous mixing. This corresponds to a molar ratio of 0.89:1 of polyepoxy compound to polyglycol. The reaction of the diepoxide with the glycol was immediate and the reaction temperature rose to 82° C. during a five-minute period. Thirty minutes later, 2.6 grams of 50 percent aqueous sodium hydroxide was added to adjust the pH of the reaction mixture to 7.45 and 0.15 gram of 75 percent ortho-phosphoric acid was added to adjust the pH to 7.25.

The product was a water-soluble, wax-like material, with aqueous solutions containing traces of insoluble gel. A 25 percent aqueous solution had a viscosity of 30.9 centistokes at 100° F.

Example 12

To 250 grams of a polyoxypropylene glycol having an average molecular weight of about 2000, maintained at 90° C. in a nitrogen atmosphere by continually admitting nitrogen to the free space above the polyoxypropylene glycol, 3.07 grams of aqueous 50 percent potassium hydroxide was added and dissolved, and 15.4 grams of butadiene diepoxide was added then and mixed three minutes at this temperature. This amount corresponds to a molar ratio of 1.4:1 of butadiene diepoxide to polyoxypropylene glycol. A quantity of the reaction mixture sufficient for viscosity observation was poured into an eight-ounce wide-mouth bottle, and maintained at 194° F. by immersion in a circulating constant temperature bath. Nitrogen was continually passed over the surface of the liquid. Viscosity readings, using a Brookfield viscometer, indicated an increase from 80 to 400 centipoises in 2½ hours following addition of the diepoxide. The viscosity sample was then sealed in the bottle, after displacing most of the air with nitrogen, and heated in an oven 21 hours at 80° C. to 90° C. The product maintained a gelatinous consistency when allowed to cool to room temperature. It was extensively cross-linked as indicated by only moderate swelling when a small sample was immersed for one hour in acetonitrile at 80° C., and was not soluble in water.

Example 13

To 400 grams of polyoxyethylene glycol having an average molecular weight of about 6000, maintained at 90° C. in an inert atmosphere, 0.45 gram of anhydrous sodium methylate was added with stirring. After stirring for 2½ hours more, at 89° C., 7.8 grams of butadiene diepoxide was then added to the mixture with vigorous agitation. This amount corresponds to a molar ratio of 1.4:1 of butadiene diepoxide to polyoxyethylene glycol. After three minutes, the resulting mixture was divided, with part being charged to an eight-ounce, wide-mouth bottle for viscosity measurements and the remainder of the mixture was transferred to an eight-inch square mold ½ inch deep and placed in a constant temperature oven at 90° C. Viscosity measurements of the sample charged to the wide-mouth bottle indicated the viscosity reached 95,000 centipoises at 200° F., 18 minutes after addition of the diepoxide. The product after cooling was a hard resinous solid and physical properties of the material cured in the mold after 18 hours at 90° C. are as follows: tensile strength, 2275 p.s.i.; elongation, zero; ASTM stiffness modulus 3900 p.s.i.; $T_f$, −7° C.; $T_4$, +37° C.; brittle temperature, −30° C.; Shore hardness, 85. ($T_f$ on an ASTM torsional stiffness curve corresponds to a point at 135,000 p.s.i. and $T_4$ corresponds on the same curve to a point at 10,000 p.s.i.)

Example 14

To 1000 grams of a polyoxyethylene glycol having an average molecular weight of approximately 6000 maintained at a temperature of 69° C. to 73° C. in an inert atmosphere of nitrogen, 2.0 grams of solid potassium were slowly added during a period of 12 minutes. Reaction of the potassium was completed at a temperature of 73° C. to 77° C. in 45 minutes, as evidenced by its complete disappearance in the solution. Three hundred sixty grams of this solution were poured into a wide-mouth bottle, and 7.18 grams of butadiene diepoxide added, and mixed by stirring manually for two minutes. This amount corresponds to a molar ratio of 1.4:1 of butadiene diepoxide to polyoxyethylene glycol. Part of the reaction mixture was then poured into a one-inch by seven-inch test tube lined with thin-walled rubber tubing, and the remainder was poured into an eight inch square mold. Both samples were covered and heated in a constant temperature oven at 90° C. for 17 hours. A brief inspection after the first hour in the oven revealed that the samples were soft and therefore incompletely cured. The final products, which were firm transparent yellow gels, were transformed to light tan-colored solids when allowed to cool to room temperature. The cast samples were shaped to desired dimensions by the milling machine for physical property evaluations. The cylindrical sample was used for determination of heat distortion and Izod impact values, and the plaque used for determination of the following properties: tensile strength, 2050 p.s.i.; elongation, 5%; ASTM stiffness modulus, 50,700 p.s.i.; $T_f$ −41° C.; brittle temperature, −42° C.; Shore hardness, 90; flexural modulus, 102,000 p.s.i. The Izod impact value was 22.2 ft. lbs. and the heat distortion temperature at 264 p.s.i. fiber-stress was 50.1° C. ($T_f$ on an ASTM torsional stiffness curve corresponds to a point at 135,000 p.s.i.)

Example 15

To 437 grams of a polyoxyethylene glycol having an average molecular weight of about 1540, maintained at 67° C. in an inert atmosphere, 1.7 grams of solid potassium was slowly added over a period of three minutes, and completely dissolved in 33 minutes while the temperature was being gradually raised to 90° C. After cooling the solution to room temperature overnight, the mixture was remelted in a nitrogen atmosphere and heated to 67° C., at which temperature 1.78 grams of additional solid potassium was added slowly over a period of two minutes, and was completely reacted in sixteen minutes, while the temperature was raised to 90° C. At this temperature 194 grams of diglycidyl ether of 2,2-bis(4-hydroxyphenyl)propane were added and the temperature of the reaction mixture was held at 90°–95° C. for 35 minutes. This amount corresponds to a molar ratio of 2.0:1 of the diglycidyl ether to polyoxyethylene glycol. Continued stirring then became impossible due to the entire reaction mixture being transformed into a firm gel. This product was cured in the flask by heating for 18½ hours in an oven at 84° C., and allowed to cool to room temperature. When a small sample of the product was heated in water on a steam bath for two hours, there were no visible signs of dissolution or of swelling.

Example 16

To 7100 grams of a polyoxyethylene glycol having an average molecular weight of about 6000 and 6887 grams of anhydrous toluene maintained at 65°–75° C. in a Read mixer, 42.5 grams of potassium hydroxide as a 50 percent aqueous solution and 276 grams of diglycidyl ether of 2,2-bis(4-hydroxyphenyl)propane were added and mixed for 16.5 hours. This corresponds to a molar ratio of 0.69:1 of polyepoxy compound to polyglycol. The reaction mixture before neutralizing had a viscosity of 80,000 centipoises at 75° C. After mixing was completed, the reaction was neutralized with 89 grams of 75 percent phosphoric acid. The pH of a ten percent methanolic solution of the reaction mixture was 6.0.

To 6900 grams of the above reaction mixture, 7200 grams of additional anhydrous toluene was added with 20 grams of monomethyl ether of hydroquinone as a stabilizer and the resultant solution was dried on a vacuum drum drier at 10–20 mm. pressure to a total solid content of the product of 99.0 percent in eight hours. A chilled sample of the feed solution to the drier had a melting point of 37° C. An air dried sample of the product had a melting range of 55–63° C. at which temperature it was very viscous.

The product was a cream colored wax-like product, easily granulated in a chipping machine, soluble in water and 97.3 percent soluble in acetonitrile. A solution prepared by dissolving 0.20 gram of the dried material in 100 ml. of acetonitrile had a reduced viscosity of 0.56 at 30° C.

*Example 17*

To 500 grams of a polyoxyethylene glycol having an average molecular weight of about 6000, maintained at a temperature above 60°–63° C. in a nitrogen atmosphere, 3.3 grams of aqueous 50 percent potassium hydroxide were added and mixed with the polyoxyethylene glycol and stirred for one-half hour, and 53 grams of the solution were poured into a two-inch by nine-inch test tube, with the air being continuously displaced by admitting nitrogen to the free space above the solution. The temperature of this portion was raised to 85° C. while stirring, and 53 grams of the diglycidyl ether of 2,2-bis-(4-hydroxyphenyl)propane were quickly added. This amount corresponds to a molar ratio of 17.7:1 of the diglycidyl ether to polyoxyethylene glycol. Twenty minutes later, at a temperature of 100° C., the mixture transformed into a gel and stirring was discontinued. The product was allowed to cool to room temperature. An eight-gram sample of the rigid resinous product did not dissolve when shaken with 72 grams of water at room temperature on a mechanical shaker. A five-gram sample showed a weight gain of 1.5 grams when agitated with 95 grams of acetonitrile for approximately 24 hours on mechanical rolls.

*Example 18*

To 673 grams of a polyoxyethylene glycol having an average molecular weight of about 4000, maintained at 63° C. in an inert atmosphere, 1.3 grams of solid potassium were slowly added over a period of four minutes. Reaction of the potassium was completed during the next 47 minutes at a reaction temperature maintained between 64° and 90° C. At the latter temperature, 119 grams of the diglycidyl ether of 2,2-bis(4-hydroxyphenyl)propane were added to the solution and mixed three minutes at 90°–95° C. This amount corresponds to a mole ratio of 2.1:1 of the diglycidyl ether to polyoxyethylene glycol. At the end of this mixing period the reaction mixture was divided by pouring one part into an eight-ounce, wide-mouth bottle and the remainder into an 8 inch by 8 inch by ½ inch steel mold. Viscosity measurements, using a Brookfield viscometer, observed at 190°–200° F. indicated that the viscosity of the sample exceeded 100,000 centipoises within 1.5 hours after addition of the diglycidyl ether of 2,2 - bis(4-hydroxyphenyl)propane. The second part of the reaction mixture in the steel mold was heated for 18 hours in an oven at 85° C. The product was allowed to cool to room temperature. A sheet of tough, moderately flexible, light colored polymer was obtained with the following properties: tensile strength, 1350 p.s.i.; ASTM stiffness modulus, 60,600 p.s.i.; and Shore hardness, 92. Elongation at the breaking point was too small to be measured on a Scott tester.

*Example 19*

To 500 grams of a polyoxyethylene glycol having an average molecular weight of about 6000 maintained at 90° C. in an inert atmosphere, 1.65 grams of a 50 percent aqueous solution of potassium hydroxide was added while stirring. The mixture was then maintained at 90° C. and 53.85 grams of diglycidyl ether of 2,2-bis(4-hydroxyphenyl)propane was added. This amount corresponds to a molar ratio of 2:1 of the diglycidyl ether to polyoxyethylene glycol. Vigorous agitation was employed in mixing the diepoxide with the polyoxyethylene glycol, the temperature being continuously maintained at about 90° C. Part of the resulting polyoxyethylene glycol-diepoxide mixture was transferred to a small steel mold measuring 8 inches by 8 inches by ½ inch in depth and closed on the top and bottom by steel cover plates. This mold, filled to a depth of about ⅜ of an inch, was placed in a constant temperature oven at 90° C. for 16 hours. The remainder of the mixture was placed in a wide-mouth bottle in a constant temperature bath for viscosity measurements with a Brookfield viscometer. Viscosity readings indicated an increase in viscosity of the polyoxyethylene glycol and diepoxide mixture to above 100,000 centipoises in 18 minutes at 200–210° F.

The molded plaque on removal from the oven resembled a firm, transparent, yellow gel which changed, on cooling to room temperature, to a tough, translucent, light-yellow solid. Properties of the product are as follows: tensile strength, 2250 p.s.i.; elongation, 5 percent; ASTM stiffness modulus, 44,640 p.s.i.; $T_f$, −8° C.; $T_4$, +36° C.; brittle temperature, −28° C.; Shore hardness, 93. ($T_f$ on an ASTM torsional stiffness curve corresponds to a point at 135,000 p.s.i. and $T_4$ to a point at 10,000 p.s.i.)

*Example 20*

A polyoxyethylene polyol derivative was prepared from sucrose and ethylene oxide using sodium methylate as a catalyst and benzene as a solvent. The sodium methylate was prepared by agitating 0.85 gram of metallic sodium in a solution containing 25 grams of methanol and 25 grams of benzene until the sodium dissolved. To the sodium methylate solution was added about 470 grams of additional benzene and 171 grams of sucrose which had passed through a 35-mesh screen. Methanol was removed from the resulting mixture by distillation in a fractionating column until the head temperature reached 80° C. The resulting slurry, containing 171 grams of sucrose, 439 grams of benzene and sodium alcoholate catalyst equivalent to 0.85 gram of sodium was charged to an Adkins rocker bomb for hydroxyethylation. Air was removed from the internal atmosphere of the bomb by pressuring ten times successively to 300 p.s.i. with nitrogen and releasing same. Ethylene oxide in amount of 650 grams was fed during four hours to the agitated mixture at a temperature of 115° C. to 123° C. and pressure of 100 to 150 p.s.i. Fifteen grams of ethylene oxide was recovered after cooling the bomb and venting it through traps cooled in Dry Ice-acetone mixture. The product mixture of 1218 grams yielded 20 grams (wet weight) of white sediment which was removed by decantation. Benzene and unreacted ethylene oxide was removed from the product by stripping and final heating at 100° for 1.0 hour at 10 mm. pressure. The residue product of 740 grams was a clear, light brown syrup which yielded negligible solids upon filtration through a "C" porosity fritted glass funnel. The average molecular weight of the product was about 1480 based on product and charging weights. The filtered product contained the equivalent of 0.24 gram of sodium determined by titration with 0.500 normal hydrochloric acid, and had the following physical properties: a viscosity of 2579 centistokes at 20° C.; specific gravity of 1.1960 at 20/20° C.; and $n_D^{20}$ of 1.4840.

An additional 0.85 gram of metallic sodium was added to 468 grams of the above residue product and the mixture was heated to 100° C. in an atmosphere of nitrogen until all the sodium dissolved. An additional 171 grams of sucrose which had passed through a 35-mesh screen was mixed with the syrup. Six hundred grams of the resulting mixture containing 160.4 grams of the new sucrose was charged to a 6780 cc. type 347 stainless steel autoclave equipped with a three-inch paddle and with a belt drive arranged to rotate the paddle at 287 r.p.m. Air was removed from the internal atmosphere of the autoclave by pressuring 25 times successively with high purity nitrogen and releasing same. Ethylene oxide in the amount of 1003 grams was fed during 8.5 hours to the agitated mixture at a temperature of 105 to 123° C. and pressure of 80 to 130 p.s.i. The reaction was interrupted after the first hour of this period by an overnight shutdown. Fifteen grams of ethylene oxide was recovered at the end of the 8.5 hour reaction period after cooling the bomb and venting it through traps cooled in Dry Ice-acetone mixture. The product mixture of 1577 grams yielded 67 grams (wet weight) of solid material which had the appearance of unreacted sucrose when filtered through a "C" porosity fritted glass funnel. The filtrate had a viscosity of 825 centistokes at 20° C.; specific gravity of 1.1450 at 20/20° C., and $n_D^{20}$ of 1.4754. The average molecular weight of the filtered product was presumed to be slightly above 1970 based on product and charging weights.

Metallic potassium amounting to 0.2 gram was stirred and heated at 100° C., in an internal atmosphere of nitrogen with 90 grams of the hydroxyethylated sucrose prepared in the preceding manner until the potassium dissolved. The solution was cooled to 50° C. at which temperature 10 grams of butadiene diepoxide was added and stirring was continued for five minutes. A portion of the resulting solution was transferred to an open Teflon pan and heated in a 90° C. constant temperature oven for 65 minutes. A yellow, hard, brittle resin was obtained.

We claim:

1. The process for producing a high molecular weight polymeric product which comprises reacting at a temperature below 250° C., a polyoxyalkylene glycol having an average molecular weight of at least 600 with an organic diepoxy compound having two oxirane epoxy groups wherein the oxirane oxygen atoms are attached to adjacent carbon atoms of an aliphatic chain and wherein said diepoxy compounds contain oxygen only in oxirane, ether and ester arrangement, in the presence of catalytic amounts of a member selected from the class consisting of Friedel-Crafts catalyst and alkali metal alcoholates of the polyoxyalkylene glycol wherein the initial polymeric product is formed by condensation of hydroxyl groups from the said glycol with epoxy groups of the said diepoxy compound, said diepoxy compound being present in amounts from about 0.2 mole to about 20 moles per mole of polyoxyalkylene glycol.

2. A process according to claim 1 wherein the diepoxy compound is further defined as composed only of carbon, hydrogen and oxygen.

3. A process according to claim 1 wherein the catalyst is an alkali metal alcoholate of the polyoxyalkylene glycol.

4. A process according to claim 1 wherein the catalyst is a Friedel-Crafts catalyst.

5. A process according to claim 1 wherein the organic diepoxy compound is the diglycidyl ether of 2,2-bis(4-hydroxyphenyl) propane.

6. A process according to claim 1 wherein the organic diepoxy compound is diglycidyl ether.

7. A process for the production of high molecular weight polymeric products which comprises reacting at a temperature below 250° C., a polyoxyethylene glycol having an average molecular weight of at least 600 with organic diepoxy compound having two oxirane epoxy groups wherein the oxirane oxygen atoms are attached to adjacent carbon atoms of an aliphatic chain and wherein said diepoxy compound contains oxygen only in oxirane, ether and ester arrangement, in the presence of at least 0.05 percent of the weight of the polyoxyethylene glycol of a member selected from the class consisting of Friedel-Crafts catalysts and alkali metal alcoholates of the polyoxyethylene glycol wherein the initial polymeric product is formed by the condensation of hydroxyl groups from the said glycol with epoxy groups of the diepoxy compound, said diepoxy compound being present in amounts of between 0.2 mole and about 20 moles per mole of said polyoxyethylene glycol.

8. A process according to claim 7 wherein the organic diepoxy compound is further defined as composed only of carbon, hydrogen and oxygen.

9. A process according to claim 7 wherein the diepoxy compound is the diglycidyl ether of 2,2-bis(4-hydroxyphenyl) propane.

10. A process according to claim 7 wherein the diepoxy compound is diglycidyl ether.

11. A process for producing a high molecular weight polymeric product which comprises reacting at a temperature below 250° C., a polyoxyalkylene polyol having an average molecular weight of at least 600 with from about 0.2 mole to about 20 moles per mole of polyoxyalkylene polyol, of an organic diepoxy compound having two oxirane epoxy groups wherein the oxirane oxygen atoms are attached to adjacent carbon atoms of an aliphatic chain and wherein said diepoxy compound contains oxygen only in oxirane, ether and ester arrangement, in the presence of catalytic amounts of a member selected from the class consisting of Friedel-Crafts catalysts and alkali metal alcoholates of the polyoxyalkylene polyol, wherein the initial polymeric product is formed by condensation of hydroxyl groups from said polyol with epoxy groups from said polyepoxy compound.

12. A process according to claim 11 wherein the organic diepoxy compound is further defined as composed only of carbon, hydrogen and oxygen.

13. The process according to claim 11 wherein the diepoxy compound is the diglycidyl ether of 2,2-bis(4-hydroxyphenyl) propane.

14. The process for producing a water-soluble extended chain polyoxyalkylene glycol which includes the steps of forming an alkali metal alcoholate of a polyoxyalkylene glycol having an average molecular weight of at least 600 with an alkali metal hydroxide in amounts of between about 0.1 and 0.5 percent by weight of said polyoxyalkylene glycol and reacting the said alkali metal alcoholate at temperatures between about 50° C. and 150° C. with the diglycidyl ether of 2,2-bis(hydroxyphenyl) propane in amounts of between about 0.2 to about 1.5 moles per mole of the polyoxyalkylene glycol.

15. A process according to claim 14 wherein the polyoxyalkylene glycol is polyoxyethylene glycol having an average molecular weight between about 1000 and 10,000.

16. A composition comprising (a) a polyoxyalkylene polyol having an average molecular weight of at least 600, (b) an organo diepoxy compound having two oxirane epoxy groups wherein the oxirane oxygen atoms are attached to adjacent carbon atoms of an aliphatic chain and wherein said diepoxy compound contains oxygen only in oxirane, ether and ester arrangement, and (c) a catalytic amount of a member selected from the group consisting of Friedel-Crafts catalysts and alkali metal alcoholates of the polyoxyalkylene polyol; and wherein the diepoxy compound is present in the composition in amounts from about 0.2 mole to about 20 moles per mole of polyoxyalkylene polyol.

17. The composition of claim 16 wherein the polyol is a glycol.

18. The polymeric water-soluble product of the composition of claim 16 cured by heating to a temperature between 50°–150° C. wherein the diepoxy compound is present in amounts of about 0.2 to about 1.5 moles per mole of the polyoxyalkylene polyol.

19. The product of claim 18 wherein the polyol is a glycol.

20. A composition comprising (a) the diglycidyl ether of 2,2-bis(4-hydroxyphenyl)propane; (b) a polyoxyethylene glycol having an average molecular weight of at least 600; (c) at least 0.05% of the weight of the polyoxyethylene glycol, of a member of selected from the group consisting of the Friedel-Crafts catalysts and alkali metal alcoholates of the polyoxyethylene glycol; wherein the diglycidyl ether of 2,2-bis(4-hydroxyphenyl)propane is present in said polymerizable composition in amounts of from about 0.2 mole to about 20 moles per mole of polyoxyethylene glycol.

21. The polymeric water-soluble product of the composition of claim 20 cured by heating to a temperature between 50°–150° C. wherein the said diglycidyl ether is present in amounts of about 0.2 to about 1.5 moles per mole of the polyoxyethylene glycol.

22. A composition comprising (a) diglycidyl ether; (b) a polyoxyethylene glycol having an average molecular weight of at least 600; (c) at least 0.05% of the weight of the polyoxyethylene glycol of a member selected from the group consisting of the Friedel-Crafts catalyst and alkali metal alcoholates of the polyoxyethylene glycol; said diglycidyl ether being present in amounts of between about 0.2 mole to about 20 moles per mole of the polyoxyethylene glycol.

23. A cured polymeric water-soluble product of the composition of claim 22 wherein the diglycidyl ether is present in amounts of about 0.2 to about 1.5 moles per mole of the polyoxyethylene glycol.

References Cited in the file of this patent

UNITED STATES PATENTS

| | | |
|---|---|---|
| 2,674,619 | Lunsted | Apr. 6, 1954 |
| 2,682,515 | Naps | June 29, 1954 |
| 2,728,744 | May et al. | Dec. 27, 1955 |
| 2,731,444 | Greenlee | Jan. 17, 1956 |